US 11,703,219 B2

(12) United States Patent
Harada et al.

(10) Patent No.: US 11,703,219 B2
(45) Date of Patent: Jul. 18, 2023

(54) GAS SWIRLING STATE DETERMINATION SYSTEM AND GASIFICATION MELTING FURNACE

(71) Applicant: MITSUBISHI HEAVY INDUSTRIES ENVIRONMENTAL & CHEMICAL ENGINEERING CO., LTD., Yokohama (JP)

(72) Inventors: Tomohiro Harada, Yokohama (JP); Hiroshi Oonuki, Yokohama (JP); Keiichi Hayashi, Yokohama (JP)

(73) Assignee: MITSUBISHI HEAVY INDUSTRIES ENVIRONMENTAL & CHEMICAL ENGINEERING CO., LTD., Yokohama (JP)

( * ) Notice: Subject to any disclaimer, the term of this patent is extended or adjusted under 35 U.S.C. 154(b) by 475 days.

(21) Appl. No.: 17/047,870

(22) PCT Filed: May 21, 2019

(86) PCT No.: PCT/JP2019/020012
§ 371 (c)(1),
(2) Date: Oct. 15, 2020

(87) PCT Pub. No.: WO2019/230486
PCT Pub. Date: Dec. 5, 2019

(65) Prior Publication Data
US 2021/0164653 A1    Jun. 3, 2021

(30) Foreign Application Priority Data
May 30, 2018    (JP) .................................. 2018-103485

(51) Int. Cl.
*F23G 5/02*    (2006.01)
*F23G 5/027*    (2006.01)
(Continued)

(52) U.S. Cl.
CPC ............... *F23G 5/027* (2013.01); *F23G 5/16* (2013.01); *F23G 5/24* (2013.01); *F23G 5/50* (2013.01);
(Continued)

(58) Field of Classification Search
CPC ... F23G 5/027; F23G 5/50; F23G 5/24; F23G 5/16
See application file for complete search history.

(56) References Cited

U.S. PATENT DOCUMENTS 5,584,255 A * 12/1996 Bishop ..................... C10J 3/14
110/235
6,161,490 A * 12/2000 Fujinami .................. C10J 3/482
110/259
(Continued)

FOREIGN PATENT DOCUMENTS

JP    62-194427 A    8/1987
JP    5-34613 B2    5/1993
(Continued)

OTHER PUBLICATIONS

International Search Report dated Jun. 18, 2019, issued in counterpart Application No. PCT/JP2019/020012 (4 pages).
(Continued)

*Primary Examiner* — Nathaniel Herzfeld
(74) *Attorney, Agent, or Firm* — WHDA, LLP

(57) ABSTRACT

The gas swirling state determination system (10) determines the quality of the swirling state of gas that swirls around the central axis. The gas swirling state determination system (10) includes an imaging device (39), an information processing device (11), and a display device (42). The imaging device (39) captures swirling gas from a direction along the central axis to acquire a still image. The information processing device (11) includes a calculation unit (40), a
(Continued)

smoothing unit (41), and a determination unit (43). The display device (42) displays a determination result.

5 Claims, 12 Drawing Sheets

(51) Int. Cl.
*F23G 5/16* (2006.01)
*F23G 5/24* (2006.01)
*F23G 5/50* (2006.01)
*G06T 7/90* (2017.01)
*G01F 23/292* (2006.01)

(52) U.S. Cl.
CPC ........ *F23G 2201/40* (2013.01); *G01F 23/292* (2013.01); *G06T 7/90* (2017.01)

(56) References Cited

U.S. PATENT DOCUMENTS 6,709,636 B1* 3/2004 Oshita ................ C10J 3/482
422/139

2013/0319300 A1* 12/2013 Sato ..................... F23G 5/32
110/255
2016/0348903 A1* 12/2016 Shirai .................. F23G 5/30

FOREIGN PATENT DOCUMENTS

| | | |
|---|---|---|
| JP | 8-105839 A | 4/1996 |
| JP | 11-140515 A | 5/1999 |
| JP | 2000-304232 A | 11/2000 |
| JP | 2001-201028 A | 7/2001 |
| JP | 2009-58216 A | 3/2009 |
| JP | 2015-227478 A | 12/2015 |
| JP | 2016-130619 A | 7/2016 |

OTHER PUBLICATIONS

Written Opinion dated Jun. 18, 2019, issued in counterpart Application No. PCT/JP2019/020012, with English Translation (11 pages).

* cited by examiner

GAS SWIRLING STATE DETERMINATION SYSTEM AND GASIFICATION MELTING FURNACE

TECHNICAL FIELD

The present invention relates to a gas swirling state determination system and a gasification melting furnace provided with the gas swirling state determination system.

This application claims priority based on Japanese Patent Application No. 2018-103485 filed in Japan on May 30, 2018, the disclosure of which is incorporated herein.

BACKGROUND ART

There are known devices that swirl gas to perform appropriate treatments. For example, a gasification melting furnace that treats waste such as municipal waste, incombustible waste, incineration residues, and sludge is known as a device that swirls pyrolysis gas for combustion and melting. Such gasification melting furnace systems includes a gasification furnace that gasifies waste by pyrolysis, and a swirling melting furnace provided downstream of the gasification furnace, and configured to combust pyrolysis gas generated by the gasification furnace at high temperatures to produce combustion gas, and melts ash contained in the gas into slag (melting treatment) (refer to Patent Document 1, for example).

CITATION LIST

Patent Document

Patent Document 1: JP 2009-58216 A

SUMMARY OF INVENTION

Technical Subject to be Solved

"A stable swirling state of gas" is empirically known as one of barometers for performing smooth melting treatment in the swirling melting furnace. The swirling state of gas is considered to be stable, for example, when combustion gas continues to swirl in the same direction at the approximately same speed, and the swirling speed of the gas is higher than a predetermined speed.

A stable swirling state of the combustion gas does not necessarily mean that the smooth melting treatment is performed. However, when the swirling state is not stable, the smooth melting treatment has not been performed and thus, measures for improvement need to be taken. Therefore, it is necessary to know the gas swirling state as one barometer and determine the quality of the state, i.e. whether the state is stable.

In the gasification melting furnace described in Patent Document 1, a luminance meter disposed on a top portion of a secondary combustion chamber measures the luminance of the secondary combustion chamber, and the amount of combustion air and the supply amount of waste are controlled based on the luminance.

However, the luminance meter generally only provides information about the total amount of luminance over the entire field of view at a given time point, and it is difficult to know the gas swirling state and determine the quality with such information.

Although a camera is installed in place of the luminance meter to capture a video, and can acquire the changes in the luminance distribution over time from this video, since the luminance distribution irregularly changes, it is difficult to objectively know the gas swirling state and determine the quality.

An object of the invention is to provide a gas swirling state determination system and a gasification melting furnace provided with the gas swirling state determination system that can determine the quality of the stability of the gas swirling state based on a video captured by an imaging device (a plurality of still images captured at different times) and display a determination result.

Solution to Subject

According to a first aspect of the present invention, a gas swirling state determination system is a gas swirling state determination system for determining quality of a swirling state of gas swirling around a central axis, the system comprising: an imaging device configured to capture the swirling gas from a direction along the central axis to acquire still images; an information processing device including a calculation unit configured to calculate luminance distribution information for each of the plurality of still images captured at different times by the imaging device to acquire a swirling speed of a centroid of the luminance or a luminance difference at a specific location of the still image as a first calculation result, a smoothing unit configured to smooth a change in the first calculation result over time to acquire a second calculation result, and a determination unit configured to compare the second calculation result with a threshold and determine the quality of the swirling state to acquire a determination result; and a display device configured to display a determination result.

According to such configuration, the quality of the swirling state of the gas is automatically determined by using the luminance distribution information of the plurality of still images captured at different times to acquire the first calculation result and smoothing the change in the first calculation result over time, and the determination result is displayed on the display device. Thus, the quality of the swirling state of the gas can be easily recognized.

In the above-described gas swirling state determination system, a luminance difference at a specific location may be a difference between a maximum value and a minimum value of the luminance on a circumference having a predetermined radius around the central axis of the still image.

In the above-described gas swirling state determination system, the swirling speed may be an angular speed around the central axis of a centroid of the luminance acquired from the plurality of still images.

In the above-described gas swirling state determination system, the threshold may have a first threshold and a second threshold, the second threshold being larger than the first threshold, the determination unit may be configured to: compare an absolute value of the second calculation result with the threshold value, determine that the swirling state is unfavorable when the absolute value is smaller than the first threshold; determine that the swirling state is favorable when the absolute value is equal to or larger than the second threshold; and determine that the swirling state is semi-unfavorable when the absolute value is equal to or larger than the first threshold and smaller than the second threshold.

According to a second aspect of the present invention, a gasification melting furnace includes: a swirling melting furnace; a secondary combustion chamber connected to an upper portion of the swirling melting furnace; and any of the above-mentioned gas swirling state determination systems, the connection site and a vicinity of the connection site constitute a throat portion having a constricted-shape, and the imaging device is disposed on a top portion of the secondary combustion chamber and is oriented to capture the throat portion.

According to such configuration, since the quality of the swirling state of gas in the gasification melting furnace is automatically determined, and the determination result is displayed on the display device, the operator of the gasification melting furnace can easily recognize the quality of the gas swirling state.

Advantageous Effects of Invention

According to the present invention, a gas swirling state determination system configured to determine the quality of the gas swirling state stability based on images captured by the imaging device and display a determination result, and a gasification melting furnace provided with the gas swirling state determination system are provided.

DESCRIPTION OF EMBODIMENTS

First Embodiment

A gasification melting furnace provided with the gas swirling state determination system and the gas swirling state determination system according to a first embodiment of the present invention will be described in detail below with reference to the drawings. Note that the gas swirling state determination system of the present invention is a system for determining the swirling state of the gas. Therefore, the system is applicable to any device that involves gas swirling. However, here, the system is applied, for example, to a gasification melting furnace provided with a swirling melting furnace, as the device, and determines the swirling state of gas in the gasification melting furnace.

Figure 1:
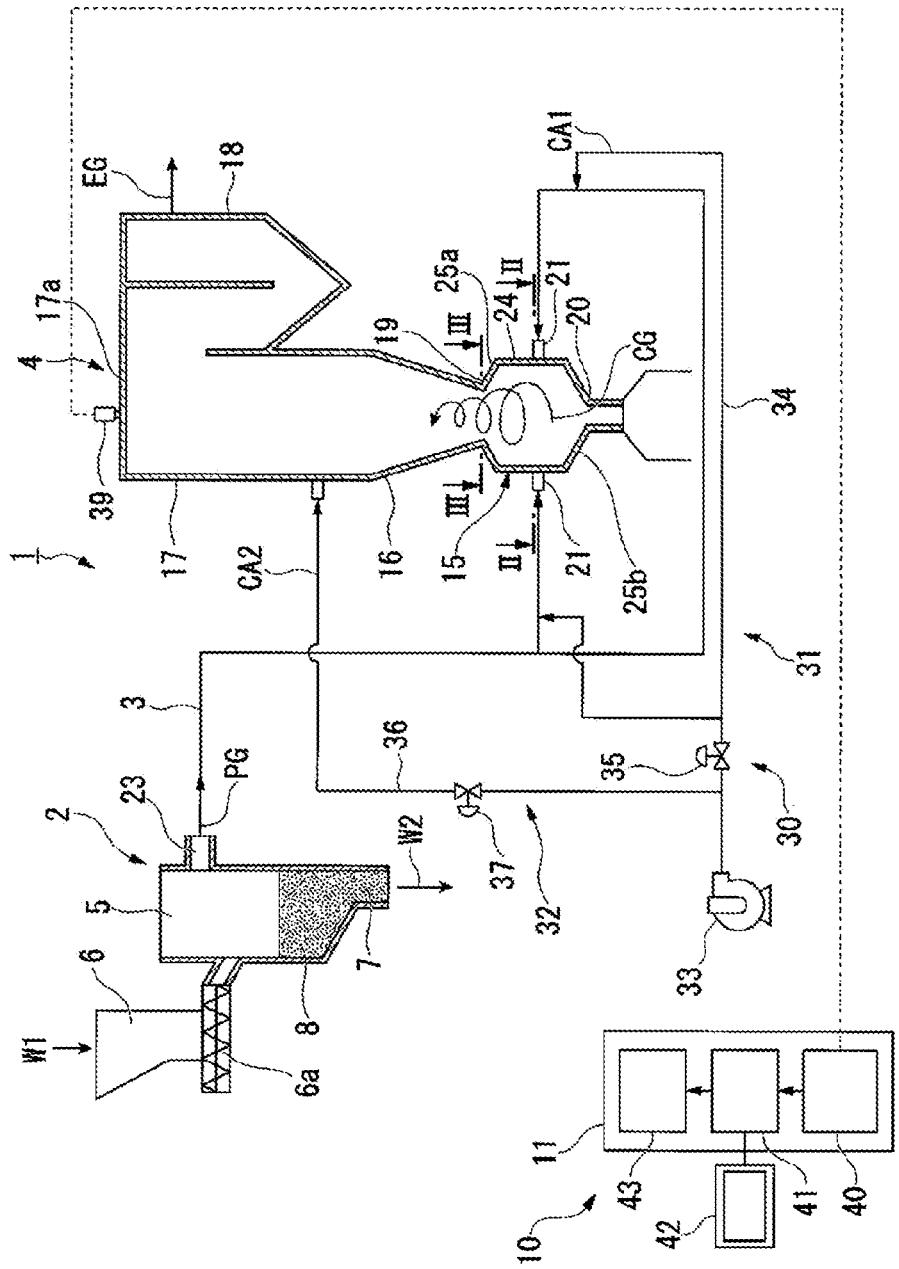
FIG. 1 is a schematic configuration view of a gasification melting furnace provided with a gas swirling state determination system of the present invention.

As illustrated in FIG. 1, a gasification melting furnace 1 in the present embodiment is a system in which a gasification furnace 2 (fluidized bed gasification furnace) pyrolyzes an object to be treated such as waste W1 into gas (hereinafter referred to as pyrolysis gas) and a melting furnace 4 combusts the gas and melts ash contained in the gas into slag.

The gasification melting furnace 1 includes: the gasification furnace 2; a melting furnace 4 having a vertical cyclone melting furnace 15 that combusts and melts pyrolysis gas gasified in the gasification furnace 2, and a secondary combustion chamber 17 connected to a top portion of the vertical cyclone melting furnace 15; a combustion air supply device 30 that supplies combustion air to the melting furnace 4; and a gas swirling state determination system 10 that determines the quality of the swirling state of combustion gas CG swirling in a throat portion 19.

The throat portion 19 is a portion including the connection site between the vertical cyclone melting furnace 15 and the secondary combustion chamber 17, and the vicinity thereof. When viewing a horizontal cross-section of the throat portion 19, the connection site is the narrowest portion of the throat portion 19 (the portion having the smallest opening area which is substantially circular). As illustrated in FIG. 1, the throat portion 19 is shaped like a constriction (constricted shape) including a portion of a first inclined face portion 25a (described below) that gradually decreases in diameter upward and a portion of a diffuser portion 16 (described below) that gradually decreases in diameter downward. The throat of throat portion 19 means a narrow passage.

The gasification furnace 2 includes a gasification furnace body 5, a waste injection port 6 provided on a side wall of the gasification furnace body 5, and a waste discharge device 6a that discharges the waste W1 injected through the waste input port 6 to the gasification furnace body 5.

A pyrolysis gas discharge port 23 for discharging pyrolysis gas PG generated in the furnace is provided at the top of the gasification furnace body 5. An incombustibles discharge port 7 for discharging incombustibles W2 is provided at the bottom of the gasification furnace body 5. The bottom of the gasification furnace body 5 is a fluidized bed with a fluidized medium 8 such as sand.

The melting furnace 4 includes the vertical cyclone melting furnace 15, the secondary combustion chamber 17 connected to the upper portion of the vertical cyclone melting furnace 15, and a boiler portion 18 connected to the downstream side of the secondary combustion chamber 17.

The vertical cyclone melting furnace 15 includes a substantially cylindrical melting furnace body portion 24, the first inclined face portion 25a that is connected to a top portion of the melting furnace body portion 24 and gradually decreases in diameter upward, a second inclined face portion 25b that is connected to a lower portion of the melting furnace body portion 24 and gradually decreases in diameter downward, and a cinder port 20 connected to a lower portion of the second inclined face portion 25b.

The pyrolysis gas PG generated by pyrolyzing the waste W1 in the gasification furnace 2 is fed through a pyrolysis gas duct 3, and it is mixed with combustion air CA1 supplied from the combustion air supply device 30 along the way. Then, the mixture is introduced into the vertical cyclone melting furnace 15.

Figure 2:
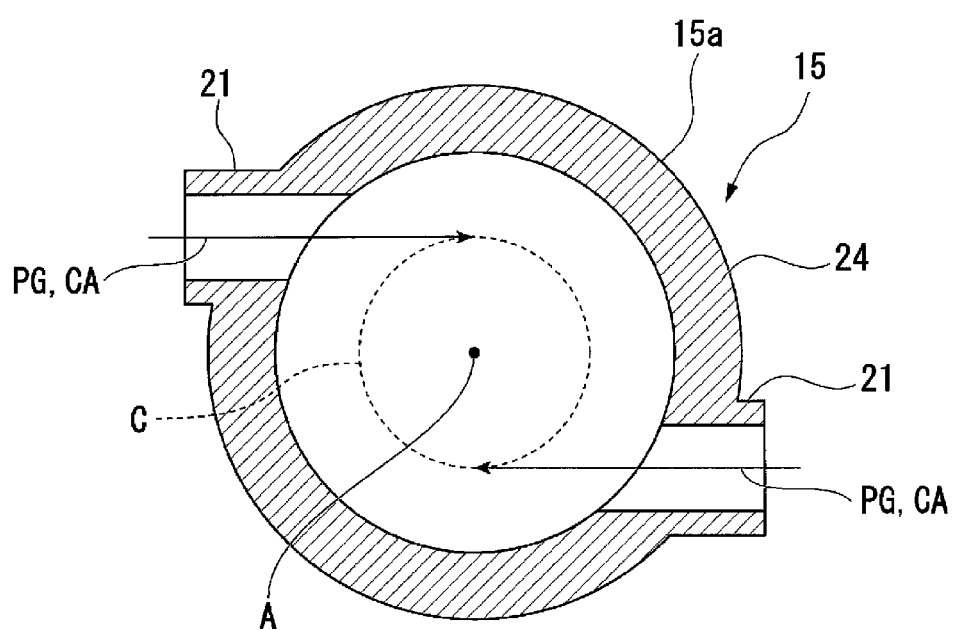
FIG. 2 is a sectional view illustrating the shape of a vertical cyclone melting furnace 15 taken along a line II-II in FIG. 1.

As illustrated in FIG. 2 that is a sectional view taken along a line II-II in FIG. 1, the vertical cyclone melting furnace 15 includes a substantially cylindrical furnace wall 15a and a pair of pyrolysis gas introduction ports 21 through which pyrolysis gas PG is introduced. The pyrolysis gas introduction ports 21 are disposed such that the pyrolysis gas PG introduced through the pyrolysis gas introduction ports 21 is ejected in the tangential direction of a circle "C" around a central axis "A" of the vertical cyclone melting furnace 15. With this configuration, the pyrolysis gas PG swirls in the vertical cyclone melting furnace 15. The gas swirling in the vertical cyclone melting furnace 15 becomes the combustion gas CG, and its combustion heat melts ash.

The combustion gas CG is introduced from the vertical cyclone melting furnace 15 into the secondary combustion chamber 17. Since the secondary combustion chamber 17 is formed in a substantially cylindrical shape that is concentric with the central axis "A" of the vertical cyclone melting furnace 15, the combustion gas CG passes through the secondary combustion chamber 17 such that the central axis of the swirling coincides with the central axis "A" of the vertical cyclone melting furnace 15.

The diffuser portion 16 that gradually decreases in diameter toward the vertical cyclone melting furnace 15 is provided at a lower end of the secondary combustion chamber 17. In other words, focusing on the flow of the combustion gas CG, the secondary combustion chamber 17 includes the diffuser portion 16 that gradually increases in diameter from the vertical cyclone melting furnace 15 toward the downstream side.

The boiler portion 18 is provided downstream of the combustion gas, that is, exhaust gas of the secondary combustion chamber 17, and heat is recovered by a superheater (not illustrated) or the like disposed on a flue. Exhaust gas EG, fed through the boiler portion 18, is fed through a dust collector (not illustrated) at a later stage, and is discharged to the atmosphere through a chimney.

As illustrated in FIG. 1, the combustion air supply device 30 includes a blower 33 that supplies air to be combustion air CA1 or CA2, a melting furnace air supply device 31 that supplies the combustion air CA1 to the vertical cyclone melting furnace 15, and a secondary combustion chamber air supply device 32 that supplies the combustion air CA2 to the secondary combustion chamber 17.

The melting furnace air supply device 31 includes a melting furnace air supply pipe 34 that connects the blower 33 to the pyrolysis gas duct 3, and can regulate the flow rate of the combustion air CA1 flowing through the melting furnace air supply pipe 34 by the melting furnace air amount regulation valve 35. The combustion air CA1 introduced into the pyrolysis gas duct 3 via the melting furnace air supply pipe 34 is mixed with the pyrolysis gas PG and supplied to the vertical cyclone melting furnace 15 via the pyrolysis gas introduction ports 21.

The secondary combustion chamber air supply device 32 includes a secondary combustion chamber air supply pipe 36 that connects the blower 33 to the secondary combustion chamber 17, and can regulate the flow rate of the combustion air CA2 flowing through the secondary combustion chamber air supply pipe 36 by the secondary combustion chamber air amount regulation valve 37. The combustion air CA2 introduced into the secondary combustion chamber 17 via the secondary combustion chamber air supply pipe 36 is used for combustion of an unburned fraction contained in the combustion gas CG passing through the secondary combustion chamber 17.

The pyrolysis gas duct 3 branches into two at a predetermined position in the flow of the pyrolysis gas PG from the upstream side (the side of the gasification furnace 2) to the downstream side (the side of the vertical cyclone melting furnace 15). The two branched pyrolysis gas ducts 3 are connected to the respective pyrolysis gas introduction ports 21. Similarly, two branched melting furnace air supply pipes 34 are connected to the two branched pyrolysis gas ducts 3, respectively.

Next, the gas swirling state determination system 10 will be described. The gas swirling state determination system 10 includes an information processing device 11 and an imaging device 39 that captures the combustion gas CG swirling around the central axis "A".

The information processing device 11 includes: a calculation unit 40 that receives information about video captured by the imaging device 39, that is, a plurality of still images "S" captured at different times (see FIG. 3), extracts information about the luminance distribution of the still images "S", calculates a first calculation result C11 based on the information, and outputs the first calculation result C11; a smoothing unit 41 that receives the first calculation result C11, smooths changes over time in the first calculation result C11, and outputs a second calculation result C12; a determination unit 43 that receives the second calculation result C12, compares the second calculation result C12 with a threshold to determine the quality of stability of the swirling state of the combustion gas CG, and outputs a result of the determination (hereinafter referred to as a "determination result"), and a display device 42 that receives the determination result and performs display corresponding to the determination result. The display device 42 may display the changes over time in the second calculation result C12 simultaneously with or separately from the determination result.

The imaging device 39 is a device that captures the combustion gas CG swirling in the throat portion 19 from the direction along the central axis of the swirling of the combustion gas CG. The imaging device 39 is disposed at a top portion 17a of the secondary combustion chamber 17, and on and in the vicinity of the central axis of the swirling of the combustion gas CG, and it is oriented to capture the throat portion 19. In the present embodiment, since the vertical cyclone melting furnace 15 and the secondary combustion chamber 17 are configured as described above, the central axis "A" of the vertical cyclone melting furnace 15 coincides with the central axis of the swirling of the combustion gas CG in the secondary combustion chamber 17. "Direction along the central axis" may be on or in the vicinity of the central axis of the swirling of gas.

Figure 3:
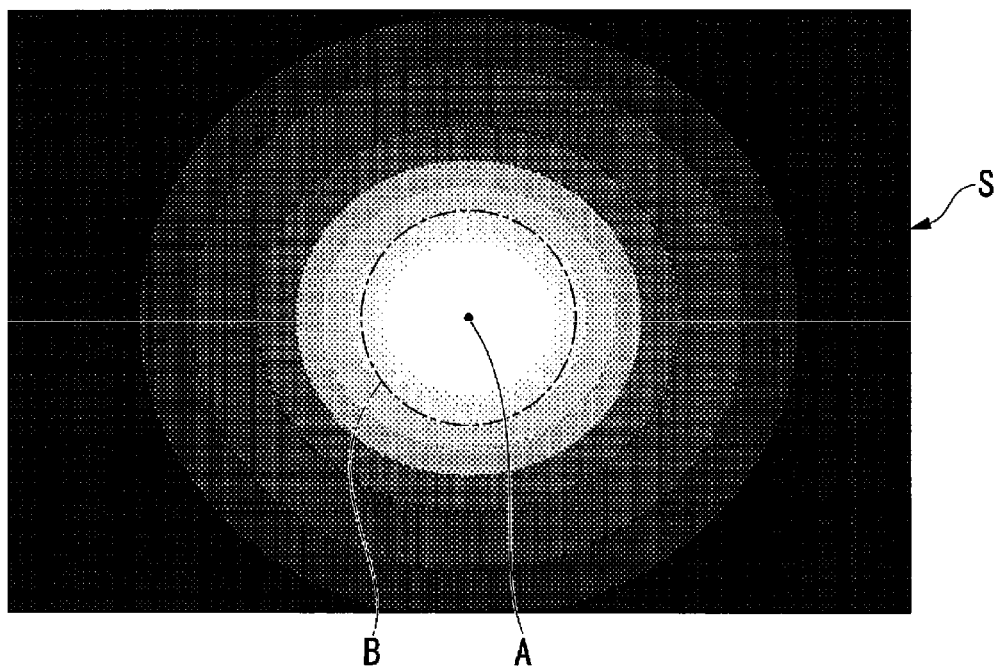
FIG. 3 is an image (still image) captured by an imaging device 39 focusing on a cross section (throat portion) taken along a line in FIG. 1.

The swirling combustion gas CG emits light by combusting the unburned fraction. FIG. 3 illustrates a still image "S" captured by the imaging device 39 focusing on the narrowest portion in the throat portion 19 (cross section taken along a line in FIG. 1) when viewing the throat portion 19 in the horizontal direction. In the still image "S", a white portion has a higher luminance and a black portion has a lower luminance.

The imaging device 39 may be any devices such as a visible camera or an infrared camera, as long as it can acquire information about the distribution of luminance (luminance distribution information). The still image "S" is captured every predetermined time (for example, 0.1 seconds) and transmitted to the calculation unit 40.

The calculation unit 40 acquires the luminance distribution information from each of the still images "S", calculates a luminance difference D1 (first calculation result C11) at a specific location using the luminance distribution information, and outputs the result.

The specific location is a reference line "B" indicated by the dot-dash line in FIG. 3, and the reference line "B" is a circumference having a predetermined radius around the central axis "A" of the swirling of the combustion gas CG (identical to the central axis "A" of the vertical cyclone melting furnace 15 in the present embodiment). The luminance difference D1 is a difference between a maximum value and a minimum value of the luminance on the reference line "B".

Figure 4:
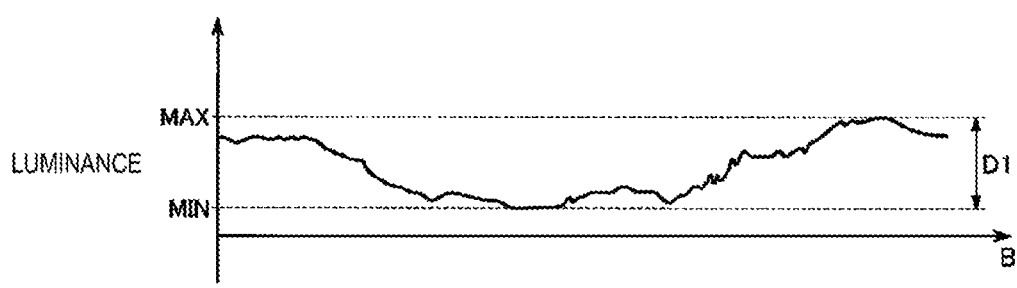
FIG. 4 is a graph in which the luminance distribution of a still image on a circumferential reference line in FIG. 3 is linearly expanded.

FIG. 4 is a graph in which the luminance distribution of the still image "S" on the reference line "B" in FIG. 3 is linearly expanded. In FIG. 4, a horizontal axis indicates the circumferential position on the reference line "B", and a vertical axis indicates the luminance. The luminance at each position on the reference line "B" can be recognized from FIG. 4.

From the luminance distribution information illustrated in FIG. 4, the calculation unit 40 calculates, as the first calculation result C11, a difference (luminance difference D1) between the maximum value (MAX) and the minimum value (MIN) of the luminance on the reference line "B". The calculation unit 40 calculates the first calculation result C11 for each of the plurality of still images "S" captured at different times.

The smoothing unit 41 smooths a set of the continuous first calculation results C11 (luminance differences D1) over time, which correspond to the still images "S", and outputs the smoothed result (second calculation result C12).

The importance of smoothing of the set of the continuous first calculation results C11 over time will be described in detail. Smoothing is generally a technique used to remove noise. The first calculation results C11 are calculation values and are not noise, but the inventor found that meaningful information about the swirling of gas could be acquired by smoothing the set of the first calculation results C11.

Figure 5:
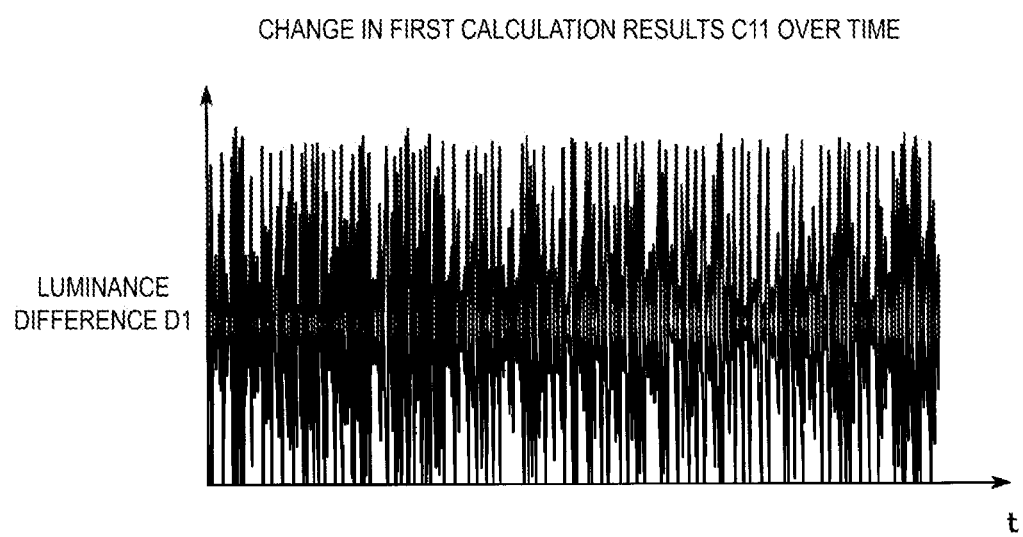
FIG. 5 is a graph (image view) illustrating changes in the first calculation result (luminance difference at a specific location in a still image) over time calculated by a calculation unit using the luminance distribution on the reference line in FIG. 4.

FIG. 5 is a graph illustrating changes in the first calculation results C11 over time acquired by the calculation unit 40. As apparent from the figure, no meaningful information about the swirling of gas can be read from the changes in the first calculation result C11 over time itself.

Figure 6:
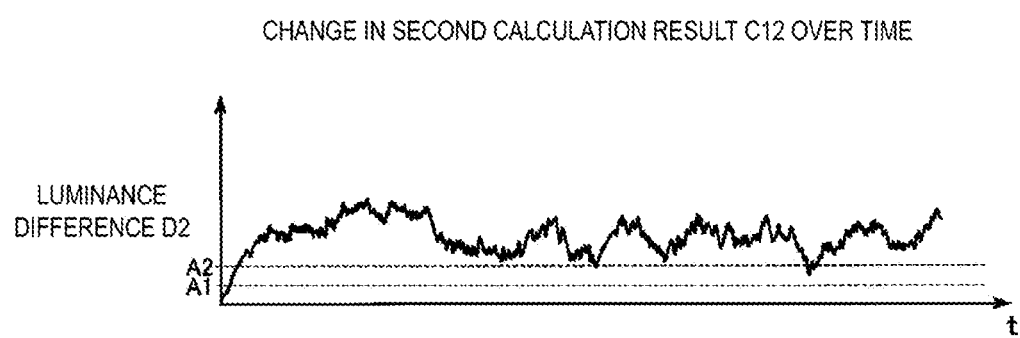
FIG. 6 is a graph illustrating changes in a second calculation result over time acquired by smoothing the first calculation result in FIG. 5.

However, a graph in which the changes in luminance difference over time are represented as one smoothly continuous line, as illustrated in FIG. 6, can be acquired by smoothing the set of the first calculation results C11 illustrated in FIG. 5. Then, when historical driving data of the gasification melting furnace and knowledge experienced by the operator (time points when it is empirically recognized that the combustion gas in the gasification melting furnace is swirling stably and is in a favorable state, and when it is empirically recognized that the combustion gas in the gasification melting furnace is swirling unstably and is in an unfavorable state, for example) are compared with the graph of FIG. 6, a certain relationship can be derived about the swirling of the combustion gas in the throat portion 19. That is, a following relationship can be derived: in comparing the luminance difference D2 (second calculation result C12) at a certain time with a first threshold A1 or a second threshold A2, the swirling of the combustion gas is favorable when the second calculation result C12 is equal to or larger than the second threshold A2, the swirling of the combustion gas is somewhat unfavorable (semi-unfavorable) when the second calculation result C12 is equal to or larger than the first threshold A1 and smaller than the second threshold A2, and the swirling of the combustion gas is unfavorable when the second calculation result C12 is smaller than the first threshold A1.

Thus, as described below, the determination unit 43 of the gas swirling state determination system 10 automatically and mechanically executes the determination based on this relationship, and causes the display device 42 to display the determination result, thereby achieving optimal operation of the gasification melting furnace 1.

Note that smoothing can be performed, for example, by calculating an average of the continuous 10 first calculation results C11. For each of the first calculation results C11, the smoothing unit 41 calculates an average of a plurality of previous first calculation results C11 including the current first calculation result C11 to acquire the second calculation result C12 (the luminance difference D2 after the smoothing). Changes in the first calculation results C11 over time can be smoothed by sequentially performing this calculation.

The smoothing is not limited thereto, and any processing of smoothing data including fine fluctuations can be adopted as appropriate.

The determination unit 43 compares the absolute value of the second calculation result C12 with the first threshold A1, determines that the swirling state of the combustion gas CG is unfavorable when the absolute value of the second calculation result C12 is smaller than the first threshold A1, and outputs a determination result indicating that the swirling state is unfavorable.

The determination unit 43 compares the absolute value of the second calculation result C12 with the second threshold A2, determines that the swirling state of the combustion gas CG is favorable when the absolute value of the second calculation result C12 is equal to or larger than the second threshold A2, and outputs a determination result indicating that the swirling state is favorable.

The determination unit 43 compares the absolute value of the second calculation result C12 with the first threshold A1 and the second threshold A2, determines that the swirling state is somewhat unfavorable (semi-unfavorable) when the absolute value of the second calculation result C12 is equal to or larger than the first threshold A1 and smaller than the second threshold A2, and outputs the determination result indicating that the swirling state is semi-unfavorable.

The display device 42 receives the determination result output from the determination unit 43, and distinguishably displays the determination results of favorable, unfavorable, and semi-unfavorable such that the operator can visually recognize the results. When distinguishably displaying the determination results of favorable, unfavorable, and semi-unfavorable, a difference in size and color of the characters may be provided.

Next, steps of the processing of the gas swirling state determination system 10 will be described using FIG. 7.

In a capture step S1, the imaging device 39 captures a video (constituted of a plurality of still images "S" captured at different times) of the throat portion 19.

In a luminance distribution information acquisition step S2, the calculation unit 40 acquires luminance distribution information from each of the still images "S".

In a first calculation step S3, the calculation unit 40 calculates the luminance difference D1 (first calculation results C11) at a specific location of the still images "S" by using the luminance distribution information, and outputs the first calculation results C11.

In a second calculation step S4, the smoothing unit 41 smooths changes in the first calculation result C11 over time to output the second calculation result C12.

In a first comparison step S5, the second calculation result C12 is compared with the second threshold A2, and when the second calculation result C12 is equal to or larger than the second threshold A2, a first display step S6 is executed. In the first display step S6, the display device 42 displays "favorable swirling" on a monitor or the like.

In a second comparison step S7, the second calculation result C12 is compared with the second threshold A2 and the first threshold A1, and when the second calculation result C12 is smaller than the second threshold A2 and is equal to or larger than the first threshold A1, a second display step S8 is executed. In the second display step S8, the display device 42 displays "somewhat unfavorable swirling" on the monitor or the like.

When the second calculation result C12 is smaller than the first threshold A1 in the second comparison step S7, a third display step S9 is executed. In the third display step S9, the display device 42 displays "unfavorable swirling" on the monitor or the like.

After the first display step S6, the second display step S8, or the third display step S9, in a graph display step S10, the display device displays the change in the second calculation result C12 over time in the form of a graph on the monitor or the like.

Upon completion of the graph display step S10, the processing returns to the capture step S1, and the above-described steps are sequentially executed again.

When the determination result displayed on the display device 42 means "unfavorable swirling" or "somewhat unfavorable swirling", it is likely that a smooth melting treatment has not been performed. Thus, to improve this situation, the operator of the gasification melting furnace 1 regulates, for example, the amount of combustion air and the input amount of the waste. In this manner, the optimal operation of the gasification melting furnace 1 can be achieved.

Second Embodiment

Next, a gas swirling state determination system and a gasification melting furnace provided with the gas swirling state determination system according to a second embodiment of the present invention will be described in detail with reference to the drawings. Note that, in the present embodiment, differences from the above-described first embodiment will be mainly described, and the description will be omitted for similar parts.

A large difference between the first embodiment and the second embodiment is that, the luminance difference D1 of the still image "S" is the first calculation result C11 in the first embodiment, while a swirling speed R1 of a luminance centroid is a first calculation result C21 in the second embodiment.

Accordingly, the content of the processing of the information processing device 11 and its constituents (the calculation unit 40, the determination unit 43, and the like) in FIG. 1 vary between the first embodiment and the second embodiment, but for simplification of explanation, the following description will be given without changing the reference number of each of the devices and constituents in the first embodiment in FIG. 1.

Figure 8:
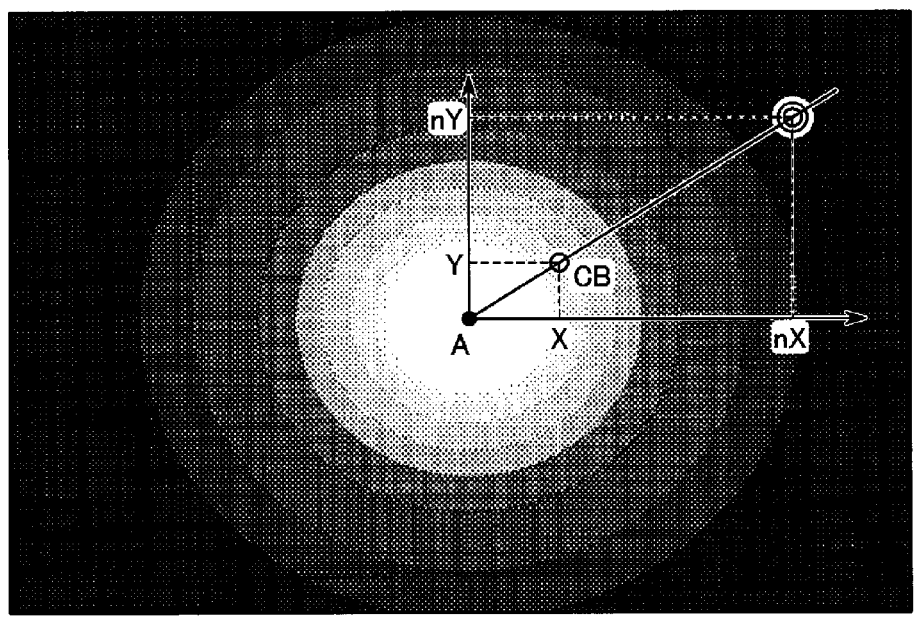
FIG. 8 is a schematic view illustrating the luminance centroid CB, which is an image (still image) captured by the imaging device 39 focusing on a cross section (throat portion) taken along a line in FIG. 1.

Similar to FIG. 3, FIG. 8 is a still image "S" captured by the imaging device 39 focusing on the throat portion 19.

As illustrated in FIG. 8, the calculation unit 40 calculates a luminance centroid CB of each still image "S" from the luminance distribution information of each still image "5", and acquires position information (X, Y) of the centroid CB on the planar coordinates.

Note that, unlike the first embodiment, the display device 42 may display a video of the imaging device 39 on a monitor or the like. At this time, a centroid marking (nX, nY) acquired by multiplying the position (X, Y) of the luminance centroid CB by "n" may be displayed such that the operator can easily recognize the position of the luminance centroid. In FIG. 8, the centroid marking is illustrated as a double circle.

The swirling speed R1 of the luminance centroid CB will be described. The swirling speed R1 of the luminance centroid CB is the angular speed of the luminance centroid CB around the central axis of the swirling of the combustion gas CG. As in the first embodiment, the central axis of the swirling of the combustion gas CG is the same as the central axis "A" of the vertical cyclone melting furnace 15.

Figure 9:
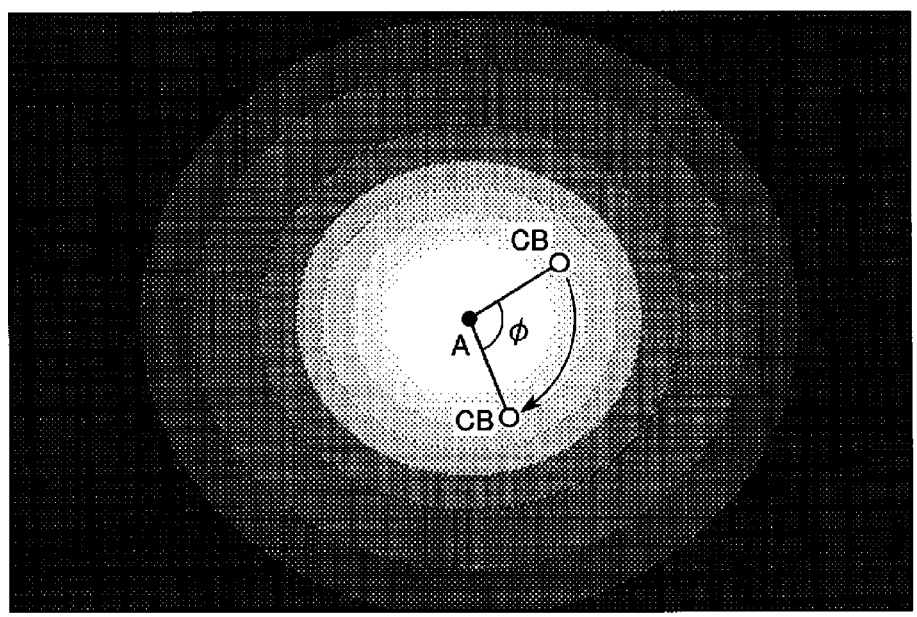
FIG. 9 is a schematic view for describing the movement of the luminance centroid CB using the image in FIG. 8.

The calculation unit 40, by using the position information (X, Y) of the luminance centroid CB, acquires the swirling speed R1 from an angular change φ in the luminance centroid CB between two continuous still images "S" that changes as illustrated in FIG. 9, and a time difference (Δt) between the still images "S". That is, the calculation unit 40 acquires the swirling speed R1 as the first calculation result C21 according to a following expression (1).

$$R1 = \varphi / \Delta t \tag{1}$$

As in the first embodiment, the smoothing unit 41 in the present embodiment smooths changes in the first calculation results C21 (swirling speed R1) over time, and outputs a second calculation result C22 (swirling speed R2).

Figure 10:
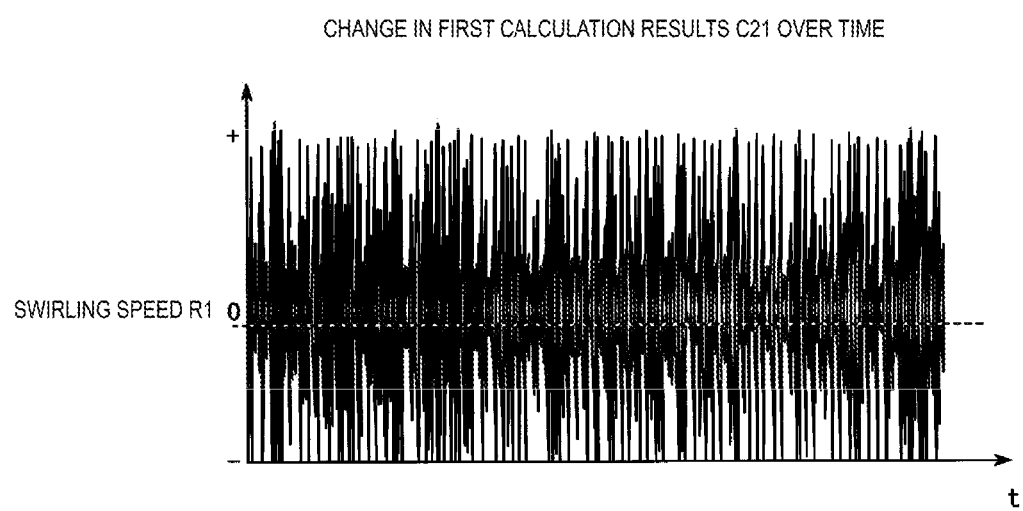
FIG. 10 is a graph illustrating changes in the first calculation result (swirling speed of the luminance centroid) over time calculated by the calculation unit using the luminance distribution of the entire viewing range in FIG. 8 or FIG. 9.

FIG. 10 is a graph illustrating changes in the first calculation results C21 over time. As in the first embodiment, the first calculation results C21 are calculation values and are not noise, but the Inventor found that meaningful information about the swirling of gas could be acquired by applying smoothing, which is the technique generally used to remove noise, to the set of the first calculation results C21.

FIG. 10 is a graph illustrating change in the first calculation results C21 over time acquired by the calculation unit 40. As shown in FIG. 10, not only the magnitude of the swirling speed R1 changes over time, but also the swirling direction changes in the forward (+) or reverse (−) direction over time. That is, as apparent from the figure, no meaningful information about the swirling of gas can be read from the changes in the first calculation results C21 over time itself.

Figure 11:
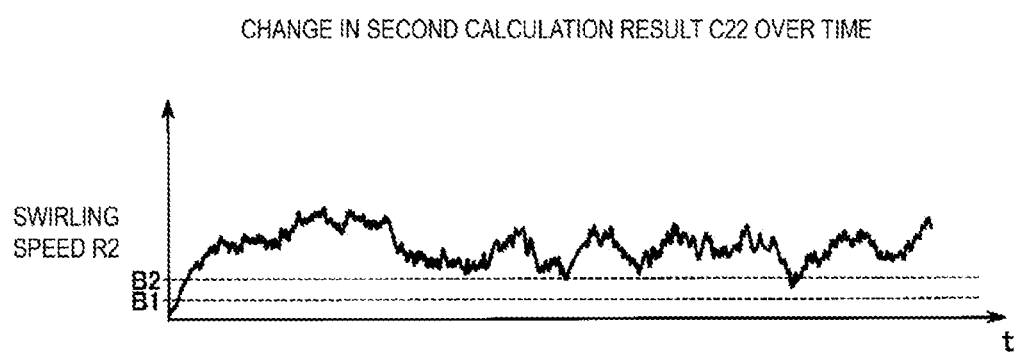
FIG. 11 is a graph illustrating changes in a second calculation result over time acquired by smoothing the first calculation result in FIG. 10.

However, a graph in which the swirling speed is represented in only one direction and changes in the swirling speed over time are represented as one smoothly continuous line, as illustrated in FIG. 11, can be acquired by smoothing the set of the first calculation results C21 illustrated in FIG. 10. Then, when historical driving data of the gasification melting furnace and knowledge experienced by the operator (time points when it is empirically recognized that the combustion gas in the gasification melting furnace is swirling stably and is in a favorable state, and when it is empirically recognized that the combustion gas in the gasification melting furnace is swirling unstably and is in an unfavorable state, for example) are compared with the graph of FIG. 11, a certain relationship can be derived about the swirling of the combustion gas. That is, a following relationship can be derived: in comparing the swirling speed R2 (second calculation result C22) at a certain time with a first threshold B1 or a second threshold B2, the swirling of the combustion gas is favorable when the second calculation result C22 is equal to or larger than the second threshold B2, the swirling of the combustion gas is somewhat unfavorable (semi-unfavorable) when the second calculation result C22 is equal to or larger than the first threshold B1 and smaller than the second threshold B2, and the swirling of the combustion gas is unfavorable when the second calculation result C22 is smaller than the first threshold B1.

Thus, as described below, the determination unit 43 of the gas swirling state determination system 10 automatically and mechanically executes the determination based on this relationship and causes the display device 42 to display the determination result, thereby, enabling optimal operation of the gasification melting furnace 1.

The determination unit 43 compares the absolute value of the second calculation result C22 with the first threshold B1, determines that the swirling state of the combustion gas CG is unfavorable when the absolute value of the second calculation result C22 is smaller than the first threshold B1, and outputs a determination result indicating that the swirling state is unfavorable.

The determination unit 43 compares the absolute value of the second calculation result C22 with the second threshold B2, determines that the swirling state of the combustion gas CG is favorable when the absolute value of the second calculation result C22 is equal to or larger than the second threshold B2, and outputs a determination result indicating that the swirling state is favorable.

The determination unit 43 compares the absolute value of the second calculation result C22 with the first threshold B1 and the second threshold B2, determines that the swirling state is somewhat unfavorable (semi-unfavorable) when the absolute value of the second calculation result C22 is equal to or larger than the first threshold B1 and smaller than the second threshold B2, and outputs a determination result indicating that the swirling state is semi-unfavorable.

Next, steps of the processing of the gas swirling state determination system 10 in the present embodiment will be described using FIG. 12.

In a capture step S11, the imaging device 39 captures a video (constituted of a plurality of still images "S" captured at different times) of the throat portion 19.

In a luminance distribution information acquisition step S12, the calculation unit 40 acquires luminance distribution information of all pixels from each of the still images "S".

In a centroid calculation step S13, the calculation unit 40 calculates, from the luminance distribution information about each still image "S", the luminance centroid CB for each still image "S" using the luminance of all pixels, and acquires position information (X, Y) of the luminance centroid CB on the planar coordinates.

In an angle calculation step S14, the calculation unit 40 calculates an angular change $\varphi$ in the luminance centroid CB of two continuous still images "S" by using the position information (X, Y) of the luminance centroid CB.

In a first calculation step S15, the calculation unit 40 calculates the swirling speed R1 (first calculation result C21) from the angular change $\varphi$ in the luminance centroid CB of two continuous still images "S" and a time difference ($\Delta t$) between the still images "S", and outputs the first calculation result C21.

In a second calculation step S16, the smoothing unit 41 smooths the set of the first calculation results C21 and outputs the second calculation result C22.

In a first comparison step S17, an absolute value of the second calculation result C22 is compared with the second threshold B2, and when the absolute value of the second calculation result C22 is equal to or larger than the second threshold B2, a first display step S18 is executed. In the first display step S18, the display device 42 displays "favorable swirling" on a monitor or the like.

In a second comparison step S19, the absolute value of the second calculation result C22 is compared with the second threshold B2 and the first threshold B1, and when the absolute value of the second calculation result C22 is smaller than the second threshold B2 and is equal to or larger than the first threshold B1, a second display step S20 is executed. In the second display step S20, the display device 42 displays "semi-unfavorable swirling" on the monitor or the like.

When the absolute value of the second calculation result C22 is smaller than the first threshold B1 in the second comparison step S19, the third display step S21 is executed. In the third display step S21, the display device 42 displays "unfavorable swirling" on the monitor or the like.

After the first display step S18, the second display step S20, or the third display step S21, in a graph display step S22, the display device displays the changes in the second calculation result C22 over time in the form of a graph in FIG. 11 on the monitor or the like.

Upon completion of the graph display step S22, the processing returns to the capture step S11, and the above-described steps are sequentially executed.

As described in the first embodiment and the second embodiment, the gas swirling state determination system and the gasification melting furnace provided with the gas swirling state determination system according to the present invention can determine the quality of the stability of the gas swirling state based on the image captured by the imaging device, and display the determination result. Thus, based on the display, the operator can optimally operate a device that performs appropriate processing by swirling the gas, such as a gasification melting furnace.

Figure 7:
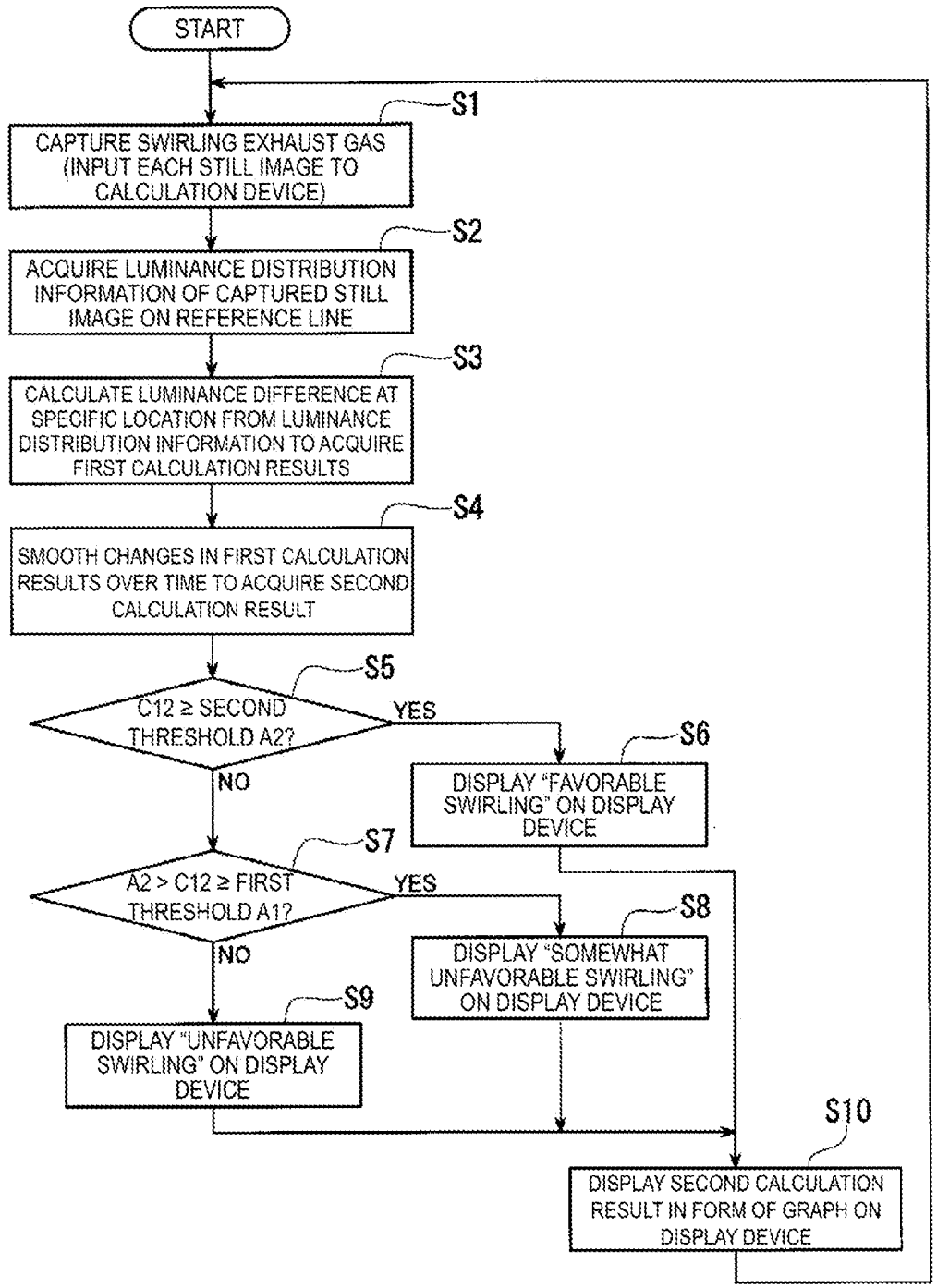
FIG. 7 is a flowchart illustrating steps of processing of the gas swirling state determination system according to the present invention, where a luminance difference at a specific location in a still image is a first calculation result.
Figure 12:
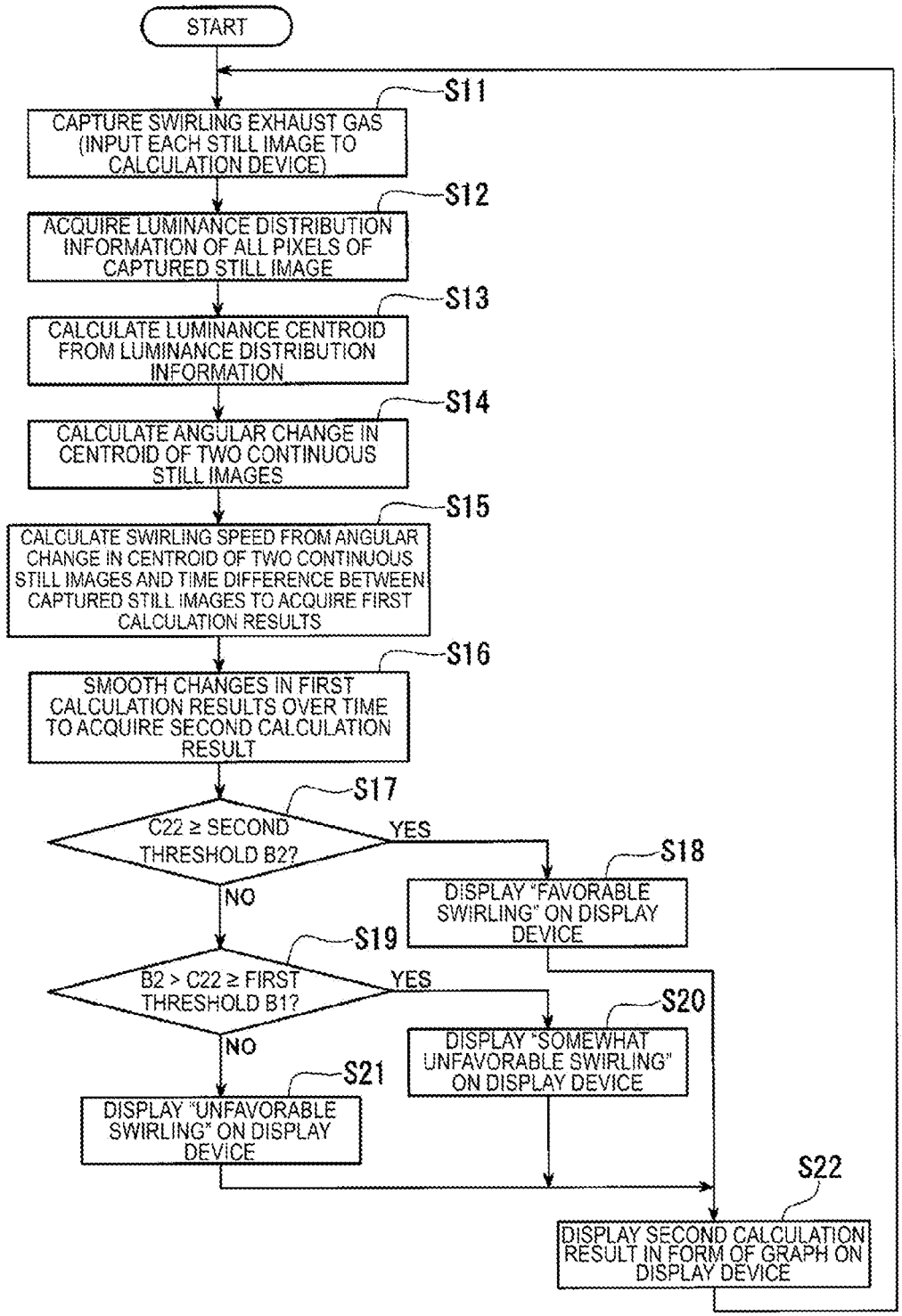
FIG. 12 is a flowchart illustrating steps of processing of the gas swirling state determination system according to the present invention, where the swirling speed of the luminance centroid is the first calculation result.

Note that the gas swirling state determination system and the gasification melting furnace provided with the gas swirling state determination system according to the present invention may execute the processing steps in one of the first embodiment and the second embodiment in FIGS. 7 and 12, or may simultaneously execute the processing steps in both embodiments.

The embodiment of the present invention has been described above in detail with reference to the drawings, but the specific configurations are not limited to those embodiments, and design changes and the like that do not depart from the scope of the present invention are also included.

INDUSTRIAL APPLICABILITY

According to the present invention, a gas swirling state determination system that is configured to determine the quality of gas swirling state stability based on images captured by an imaging device and display a determination result, and a gasification melting furnace provided with the gas swirling state determination system are provided.

REFERENCE SIGNS LIST

1 Gasification melting furnace
2 Gasification furnace
3 Pyrolysis gas duct
4 Melting furnace
5 Gasification furnace body
6 Waste input port
6a Waste discharge device
7 Incombustibles discharge port
8 Fluidized medium
10 Gas swirling state determination system
11 Information processing device
15 Vertical cyclone melting furnace
15a Furnace wall
16 Diffuser portion
17 Secondary combustion chamber
18 Boiler portion
19 Throat portion
20 Cinder port
21 Pyrolysis gas introduction port
23 Pyrolysis gas discharge port
25a First inclined face portion
25b Second inclined face portion
30 Combustion air supply device
31 Melting furnace air supply device
32 Secondary combustion chamber air supply device
33 Blower
34 Melting furnace air supply pipe
35 Melting furnace air amount regulation valve
36 Secondary combustion chamber air supply pipe
37 Secondary combustion chamber air amount regulation valve
39 Imaging device
40 Calculation unit
41 Smoothing unit
42 Display device
43 Determination unit
C11, C21 First calculation result
C12, C22 Second calculation result
D1 Luminance difference
EG Exhaust gas
PG Pyrolysis gas
R1 Swirling speed
W1 Waste
CG Combustion gas

The invention claimed is:

1. A gas swirling state determination system for determining quality of a swirling state of gas swirling around a central axis, the system comprising:
an imaging device configured to capture the swirling gas from a direction along the central axis to acquire still images;
an information processing device including a calculation unit configured to calculate luminance distribution information for each of the plurality of still images captured at different times by the imaging device to acquire a swirling speed of a centroid of the luminance or a luminance difference at a specific location of the still image as a first calculation result, a smoothing unit configured to smooth a change in the first calculation result over time to acquire a second calculation result, and a determination unit configured to compare the second calculation result with a threshold and determine the quality of the swirling state to acquire a determination result; and
a display device configured to display the determination result.

2. The gas swirling state determination system according to claim 1, wherein
the luminance difference is a difference between a maximum value and a minimum value of the luminance on a circumference having a predetermined radius around the central axis of the still image.

3. The gas swirling state determination system according to claim 1, wherein
the swirling speed is an angular speed around the central axis of the centroid of the luminance acquired from each of the plurality of still images.

4. The gas swirling state determination system according to claim 1, wherein
the threshold has a first threshold and a second threshold, the second threshold being larger than the first threshold,
the determination unit is configured to:
compare an absolute value of the second calculation result with the threshold value,
determine that the swirling state is unfavorable when the absolute value is smaller than the first threshold;
determine that the swirling state is favorable when the absolute value is equal to or larger than the second threshold; and
determine that the swirling state is semi-unfavorable when the absolute value is equal to or larger than the first threshold and smaller than the second threshold.

5. A gasification melting furnace comprising:
a swirling melting furnace;
a secondary combustion chamber connected to an upper portion of the swirling melting furnace; and
the gas swirling state determination system according to claim 1, wherein
the connection site and a vicinity of the connection site constitute a throat portion having a constricted-shape, and
the imaging device is disposed on a top portion of the secondary combustion chamber and is oriented to capture the throat portion.

* * * * *